Sept. 28, 1965  M. BOCHORY  3,208,571
CENTRIFUGALLY OPERATED CLUTCH MECHANISM
Filed Sept. 4, 1962  3 Sheets-Sheet 1

INVENTOR
Michael Bochory
BY
ATTORNEY

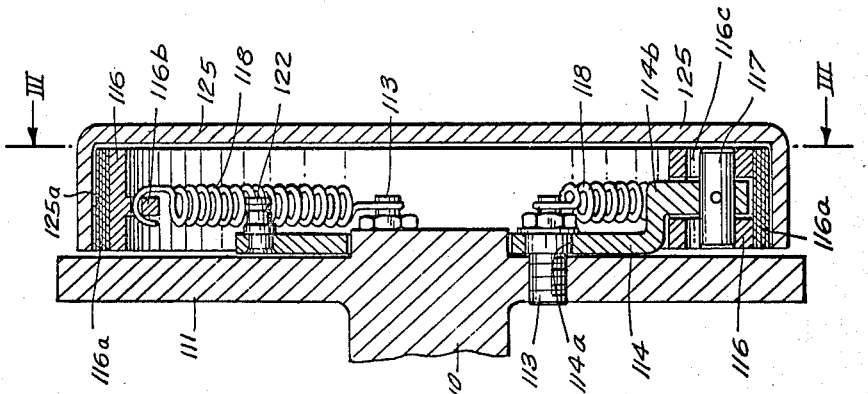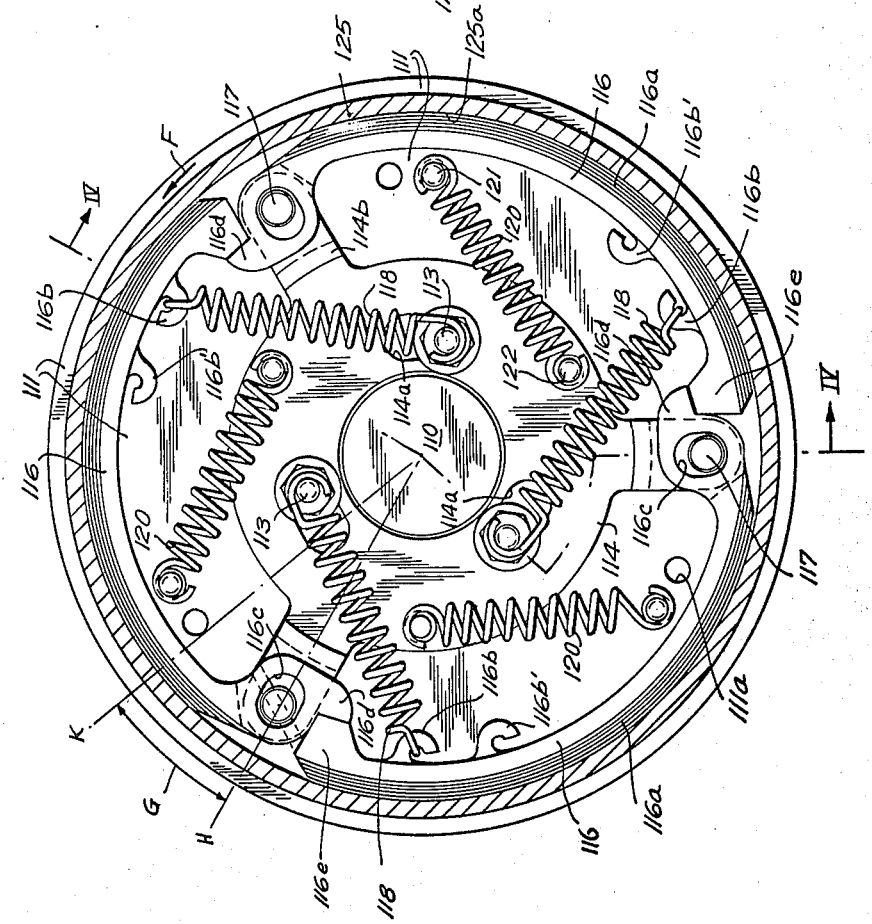

Sept. 28, 1965  M. BOCHORY  3,208,571
CENTRIFUGALLY OPERATED CLUTCH MECHANISM
Filed Sept. 4, 1962  3 Sheets-Sheet 3
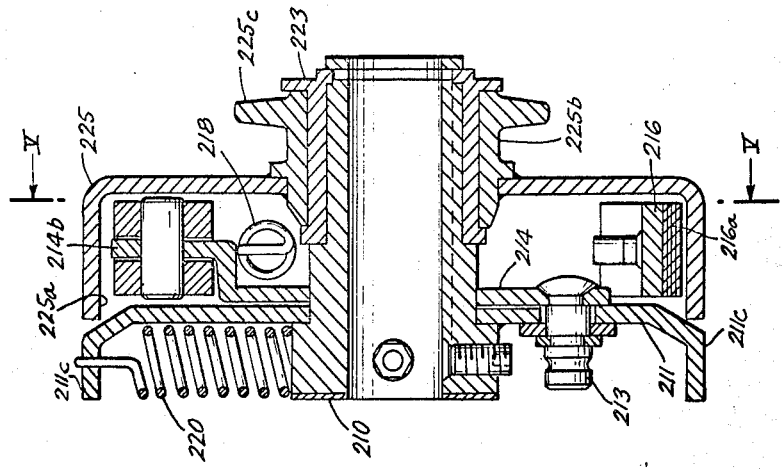
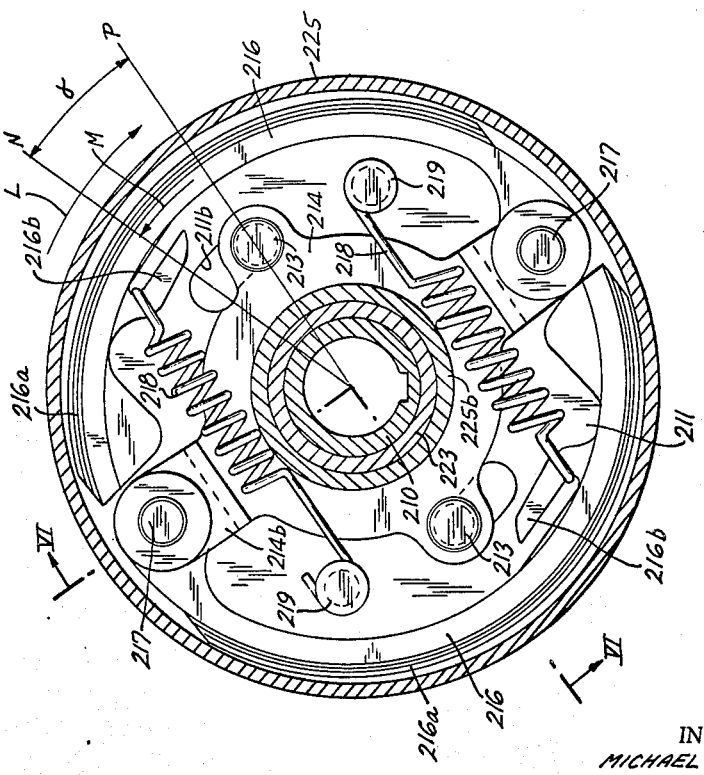
INVENTOR:
MICHAEL BOCHORY
BY
Michael S. Striker
his ATTORNEY

United States Patent Office 3,208,571
Patented Sept. 28, 1965

3,208,571
CENTRIFUGALLY OPERATED CLUTCH
MECHANISM
Michael Bochory, Culver City, Calif.
(5248 Veronica, Los Angeles, Calif.)
Filed Sept. 4, 1962, Ser. No. 221,939
Claims priority, application France, January 4, 1960,
814,907
9 Claims. (Cl. 192—105)

This is a continuation-in-part of my application Serial No. 78,948, filed December 28, 1960, now abandoned.

The present invention relates to clutch mechanisms in general, and more particularly to improvements in an automatic clutch mechanism of the type wherein clutch shoes mounted on a rotary driving member may engage and then rotate a rotary driven member under the action of centrifugal force in response to rotation of the driving member.

In conventional clutch mechanisms of the above-outlined type, centrifugal force acting on the shoes varies in dependency on rotational speed of the driving member so that slip may occur below a certain rotational speed for any given load conditions. Thus, when an engine drives a load through a centrifugal clutch mechanism and when an increase in the load causes a reduction in the speed of the driving member, centrifugal force is insufficient to prevent slippage of the brake or clutch shoes with respect to the driven member, and such slippage continues until the power of the engine is increased to overcome the load and to increase the rotational speed of the driving member with resultant increase in centrifugal force acting upon the shoes.

It is an important object of my invention to provide an improved centrifugal clutch mechanism which is capable of establishing a slip-free driving connection between a driving member and a driven member even if the centrifugal force acting upon the shoes at reduced rotational speed of the driving member decreases to a magnitude which could not prevent slippage in conventional clutch mechanisms of which I am aware at this time.

Another object of the invention is to provide an automatic clutch mechanism of the just outlined characteristics which is constructed and assembled in such a way that the brake or clutch shoes are moved gradually into frictional motion transmitting engagement with the driven member in response to increasing rotational speed of the driving member, and that the shoes may be rapidly disengaged from the driven member when the rotational speed of the driving member reaches a predetermined minimal value.

A further object of the invention is to provide a very simple, compact and highly reliable clutch mechanism for use in motorcycles, in other types of automotive vehicles, and in many industrial establishments wherein rotary motion must be transmitted at a controlled rate.

An additional object of the invention is to provide a centrifugal clutch mechanism wherein a rotary driving member transmits motion to a rotary driven member by friction generated by a series of spring-biased clutch shoes of the type wherein the shoes are normally biased to inoperative position, the mechanism being constructed and assembled in such a way that the bias upon the shoes is reduced at a rate proportional with increasing speed, friction and pressure of the shoes.

A concomitant object of the invention is to provide a clutch mechanism of the above outlined characteristics wherein slippage between the driven member and the shoes may be controlled with utmost precision so that slippage will take place only under such circumstances when a slip-free connection between the driving and driven members could damage the mechanism or would be undesirable for other reasons.

Still another object of my invention is to provide an automatic clutch mechanism wherein a series of brake shoes may be mounted on a common support to insure that each brake shoe engages the driven member with identical force.

With the above objects in view, the invention resides in the provision of a centrifugal clutch mechanism which comprises a rotary driven member, a rotary driven member, and motion transmitting means for driving the driven member in response to rotation of the driving member. The motion transmitting means comprises supporting means secured to and movable with respect to the driving member between a first and a second position, at least one brake or clutch shoe articulately mounted on the supporting means and movable by centrifugal force into frictional engagement with the driven member, and resilient means operating between the driving member and the shoe for biasing the shoe out of frictional engagement with the driven member and being arranged in such a way that its bias upon the shoes decreases if the supporting means moves from its first to its second position in response to frictional engagement between the shoe and the driven member. The motion transmitting means preferably comprises second resilient means operating between the driving member and the supporting means for biasing the latter to its first position.

The supporting means may assume the form of a plate which is pivotable of rotatable with respect to the driving member within predetermined limits and which supports one, two or more clutch shoes. Alternately, the supporting means may comprise separate supporting plates for each clutch shoe.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 3 is a transverse section through a modified clutch mechanism which comprises three clutch shoes and a single supporting means for the shoes, the section of FIG. 3 being taken in the direction of arrows as seen from the line III—III of FIG. 4;

FIG. 4 is a section as seen in the direction of arrows from the line IV—IV of FIG. 3;

FIG. 5 is a transverse section through a clutch mechanism which constitutes a modification of the mechanism shown in FIGS. 3 and 4, the section of FIG. 5 being taken in the direction of arrows as seen from the line V—V of FIG. 6; and FIG. 6 is a section as seen in the direction of arrows from the line VI—VI of FIG. 5.

Figure 1:
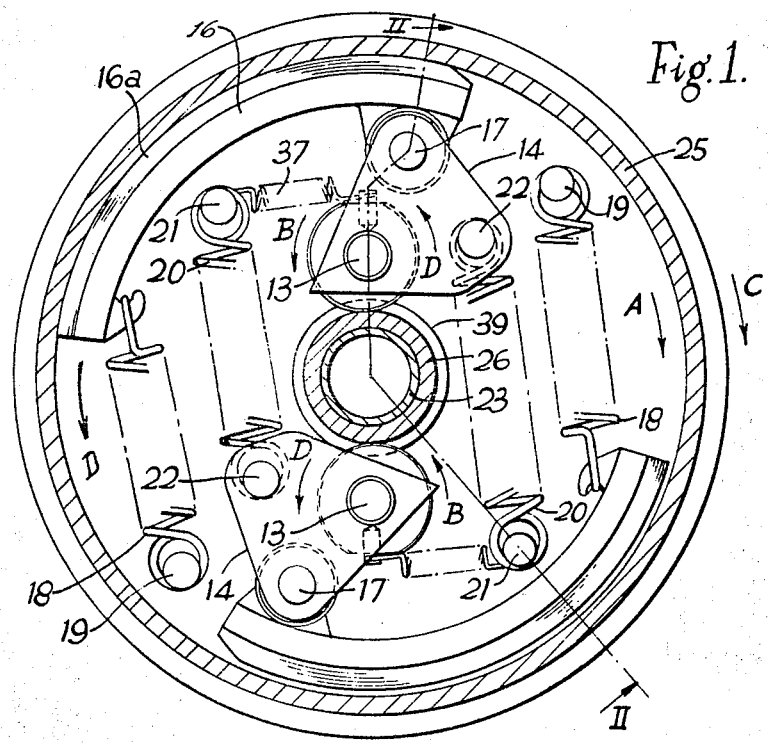
FIG. 1 is a transverse section through a centrifugal clutch mechanism with two clutch shoes which embodies one form of my invention, one of the clutch shoes being shown in inoperative position and the other clutch shoe being shown in operative position.
Figure 2:
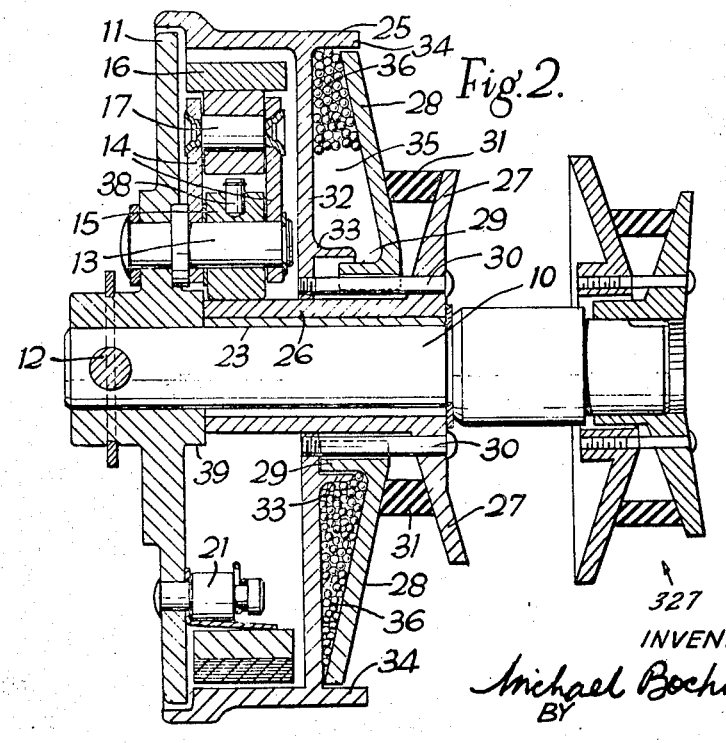
FIG. 2 is a section as seen in the direction of arrows from the line II—II of FIG. 1, the variable-diameter pulley of the clutch mechanism being shown in two different positions.

Referring now in greater detail to the drawings, and first to FIGS. 1 and 2, there is shown a clutch mechanism which comprises a centrifugal clutch, a unidirectional clutch, and a variable-diameter pulley which performs the function of a reduction gear. This clutch mechanism comprises a variable-speed driving shaft 10 carrying a driving member in the form of a flywheel 11, which is secured thereto by a conical pin 12, and a variable diameter pulley 327. Two connecting means here shown as spindles 13 are secured to the driving member 11 at diametrically opposite sides of the shaft 10. Each of these spindles supports a pair of spaced supporting plates 14 and an eccentric roller 15 which latter is disposed in the space between the respective pair of plates 14. The rollers 15 and the pairwise arranged plates 14 are pivotable on the respective spindles 13.

Each pair of plates 14 supports an arcuate brake or clutch shoe 16 provided with a brake lining 16a, and it will be noted that the leading end of each brake shoe (as seen in the normal direction A of rotation of the driving member 11) is pivotable on a connecting means here shown as a pivot pin 17 which is mounted in and which extends transversely across the space between the respective pair of supporting plates 14.

The linings 16a preferably cover the entire outer faces of the shoes 16. The shoes 16 are biased by resilient means in the form of helical return springs 18 each of which tends to move the respective brake shoe to an inoperative position, i.e., inwardly and toward the driving shaft 10 (see the lower brake shoe 16 in FIG. 1). The springs 18 are secured to studs 19 which are anchored in the driving member 11, and the other end of each of these springs engages a hook-shaped retainer provided at the trailing end of the respective brake shoe 16. FIG. 1 shows that the studs 19 are positioned to the rear of radial lines which connect the trailing ends of the respective brake shoes with the axis of the driving member 11.

The supporting plates 14 are of triangular shape and the spindles 13 extend through apertures provided in the trailing corner portions of the respective plates, as seen in the direction in which the driving member 11 rotates (arrow A). The pivot pins 17 extend between the outer corner portions of the respective plates 14, i.e., between such corner portions which are more distant from the shaft 10 than the corner portions traversed by the respective spindles 13. The supporting plates 14 are biased by resilient means here shown as helical support springs 20 which tend to pivot the respective pairs of plates in a clockwise direction, as viewed in FIG. 1, so as to move the respective pins 17 toward the driving shaft 10. One end of each spring 20 is secured to one of two studs 21 which are anchored in the driving member 11, and the other end of each spring 20 is secured to a pin 22 extending between the leading corner portions of the respective plates 14. The material of the plates 14 is preferably of high specific weight so that these plates act as flyweights and tend to move the leading ends of the shoes 16 radially outwardly when the driving member 11 rotates in the direction indicated by arrow A, i.e., these plates are subjected to the action of centrifugal force in such a way that they tend to expand the respective springs 20 and to pivot in an anticlockwise direction (arrows D), as viewed in FIG. 1, when the driving member 11 rotates.

A driven member here shown as a drum 25 which surrounds the brake linings 16a is coaxially secured to an elongated sleeve 26 which is rotatable on a sleeve bearing 23 surrounding the driving shaft 10. That end portion of the sleeve 26 which is remote from the driving member 11 is formed with a flange 27, and this flange constitutes one rim of a variable-diameter pulley. The other rim of this pulley is formed by a flange 28 whose annular collar or hub 29 surrounds with clearance the periphery of the sleeve 26. The internal surface of the collar 29 is formed with a series of axially parallel substantially semicylindrical recesses each of which receives an axially parallel pin 30. These pins are arranged in such a way that they form an annulus about the sleeve 26 and are secured to the flange 27 as well as to the driven member 25. The pins 30 are precision fitted into but are slidable in the respective semicylindrical recesses so that the flange 28 may move in the axial direction of the sleeve 26 toward or away from the flange 27. FIG. 2 shows that the flanges 27, 28 diverge radially outwardly to form a V-shaped groove for a driving belt 31 and, by being movable on the pins 30 toward and away from the flange 27, the flange 28 may vary the effective diameter of the pulley.

The driven member 25 comprises a disk-shaped web 32 which is provided with an annular inner flange 33 extending toward the flange 28 to surround at least a portion of the collar 29, and with an annular outer flange 34 which surrounds the periphery of the flange 28. The flanges 28, 33, 34, the web 32, and the collar 29 define between themselves an annular chamber 35 whose side walls converge radially outwardly and which accommodates a supply of steel balls 36. When the driven member 25 rotates, centrifugal force compels the balls 36 to move radially outwardly whereby the balls tend to move the flange 28 toward the flange 27, i.e., in a direction away from the web 32.

The rollers 15 are eccentric to the respective spindles 13 and are biased by clutch springs 37 so that their convex surfaces engage and remain in contact with the cylindrical peripheral surface of the sleeve 26 at points to the rear of radial lines extending between the axes of the respective spindles 13 and the axis of the sleeve 26. One end of each spring 37 is secured to the adjacent stud 21 (that is, to the driving member 11), and the other end of each spring 37 is secured to a stud 38 fixed to and extending radially outwardly from the respective roller 15. The rollers 15 constitute clutch elements of a uni-directional clutch which prevents reverse rotations of the driving member 11 with respect to the driven member 25.

The clutch mechanism of FIGS. 1 and 2 operates as follows:

It is assumed that the mechanism is installed in a motorcycle, that the engine of the motorcycle drives the shaft 10, and that the belt 31 transmits rotation to the front or rear wheel of the conveyance, as the case may be. Before the engine which drives the shaft 10 is started, the operator tensions the belt 31 so as to force the flange 28 away from the flange 27 and to permit the belt to move radially inwardly toward the sleeve 26. Such position of the belt 31 is shown in the lower half of FIG. 2. When they drive the belt 31, the driven member 25 and the sleeve 26 rotate in a clockwise direction (arrow C), as viewed in FIG. 1, and the sleeve 26 rotates freely on the bearing 23 to rotate the rollers 15 in an anticlockwise direction (arrows B in FIG 1). However, since the axes of the rollers 15 are eccentric to the axes of the respective spindles 13, the rollers 15 will jam against the sleeve 26 and may establish a driving connection between the driving member 11 and the sleeve 26.

When the engine is started, the shaft 10 first drives the driving member 11 at an idling speed which exceeds the rotational speed of the sleeve 26, whereby the rollers 15 are free to slide about the sleeve. At such idling speed, the springs 20 maintain the supporting plates 14 in their innermost radial positions and the springs 18 maintain the brake shoes 16 in inoperative positions as shown in the lower half of FIG. 1.

When the rotational speed of the driving member 11 increases and reaches a predetermined magnitude, centrifugal force acting upon the shoes 16 pivots the shoes about the respective pins 17 (against the bias of the springs 18) so that the trailing ends of the brake linings 16a come into contact with the internal cylindrical surface of the driven member 25. As the rotational speed of the driving member 11 (and hence the centrifugal force acting on the brake shoes 16) increases, friction developing between the linings 16a and the internal cylindrical surface of the driven member 25 causes the supporting plates 14 to pivot rearwardly about the respective spindles 13 (arrows D in FIG. 1), and to thereby expand the springs 20, i.e., each supporting plate then moves with respect to the driving member 11 from a first position (in which it is being normally held by the respective spring 20) to a second position in which it causes the respective spring 18 to reduce its bias upon the shoe 16. Friction between the linings 16a and the driven member 25 is assisted by centrifugal force acting on the supporting plates 14 which tend to pivot in an anticlockwise direction, as viewed in FIG. 1, and to thereby move the leading ends of the brake shoes 16 rearwardly and outwardly toward the internal surface of the driven member 25 to increase the area of contact between the driven member and the linings 16a. Consequently, the frictional force increases still further and causes the plates 14 to continue their pivotal movement against the bias of the respective springs 20. Such self-braking action continues progressively until the leading ends of the linings 16a are wedged firmly against the driven member.

As the plates 14 pivot in an anticlockwise direction (arrows D), they cause angular displacements of the respective brake shoes counter to the direction indicated by arrows A and C, i.e., toward the associated studs 19, whereby the tension of springs 18 is reduced. Of course, as the trailing ends of the brake shoes move toward the associated studs 19, the bias of springs 18 upon such trailing ends is reduced and the springs permit centrifugal force to move the linings 16a into stronger frictional engagement with the internal cylindrical surface of the driven member 25. Such stronger frictional engagement counteracts the bias of springs 20 upon the supporting plates 14.

When the linings 16a become worn after extended periods of actual use, rearward pivotal movement of the supporting plates 14 beyond an end position is prevented by abutment of one of each pair of supporting plates against an annular stop 39 which is fixed to or which forms an integral part of the driving member 11. In FIG. 2 the left-hand supporting plate 14 of the upper brake shoe 16 is disposed in the radial plane of the stop 39 and may abut against this stop if the brake lining on the upper shoe is worn away to a given extent. At the time the supporting plates are permitted to abut against the stop 39, the brake shoes 16 assume their rearmost positions and the bias of springs 18 is almost nil.

If the rotational speed of the engine is reduced due to overloading, the shoes 16 are still forced against the driven member 25 substantially by the entire centrifugal force which acts on the shoes to force them against the internal cylindrical surface of the driven member. However, when the engine returns to idling speed, the springs 18, 20 immediately retract the linings 16a from the driven member 25 whereby the springs 18 act directly upon the brake shoes and the springs 20 act upon the respective supporting plates.

When the driven member 25 is rotated at a speed higher than idling speed, centrifugal force compels the balls 36 to move radially outwardly whereby the balls cause the flange 28 to move toward the flange 27, and to increase the effective diameter of the pulley by simultaneous increase in the speed at which the belt 31 is driven. The belt 31 is trained around a second variable-diameter pulley (not shown) whose rims are movable toward each other by suitable springs or the like. As is well known in the art of variable-diameter pulleys, any changes in the effective diameter of the pulley 27, 28 will bring about corresponding changes in the diameter of the other pulley, i.e., the effective diameter of the non-illustrated pulley will increase if the effective diameter of the pulley 27, 28 decreases, or vice versa.

While the clutch mechanism of FIGS 1 and 2 is especially suited for use in motorcycles, it is capable of many other uses not only in various types of conveyances but also in machines which are used in many branches of industry. It will be readily understood that the variable-diameter pulley 27, 28 may be replaced by other types of secondary clutches which are operated by electromagnetic means, by a hydraulic or pneumatic system, by vacuum servo control or in any other suitable way. The driven member 25 then constitutes the driving element of the secondary clutch.

The supporting plates 14, the brake shoes 16 and the resilient means 18, 20 together constitute a means for transmitting rotary motion of the driving member 11 to the driven member 25.

Refering now to FIGS. 3 and 4, there is shown a greatly simplified clutch mechanism which comprises a centrifugal clutch including rotary driving means consisting of a driving shaft 110 and a driving member in the form of a flywheel 111 which is integral with the shaft 110. The driven member assumes the form of a rotary drum 125 which is coaxial with the driving shaft 110 and which is connected to or integral with a driven shaft, not shown. The means for transmitting rotary motion from the driving member 111 to the driven member 125 comprises a single supporting plate 114 which is rotatable on the driving shaft 110 between a pair of slightly spaced angular positions and which is adjacent to the right-hand side of the driving member 111, as viewed in FIG. 4, and three arcuate brake shoes 116 mounted on the supporting plate 114 and provided with brake linings 116a adapted to engage by friction the internal cylindrical surface 125a of the driven member 125 in response to a predetermined rotational speed of the driving means 110, 111.

The supporting plate 114 is formed with three arcuate guide slots 114a which are arranged on the periphery of a circle concentric with the driving member 111, and each of these slots receives a pin 113 which is anchored in the driving member so that the pins 113 and the slots 114a determine the extent to which the plate 114 may be angularly displaced about the axis of the shaft 110. Thus, the pins 113 and the walls bounding the slots 114a constitute cooperating stop means for arresting the plate 114 in two spaced angular positions with respect to the driving member 111. The plate 114 is biased by three resilient elements here shown as coil springs 120 each having one of its ends secured to one of three studs 121 anchored in the driving member 111 and its other end secured to one of three studs 122 anchored in the plate 114. The springs 120 tend to rotate the plate 114 in a counter clockwise direction so that the pins 113 are normally received in the trailing ends of the slots 114a, as viewed in FIG 3, it being assumed that the driving member rotates in an anticlockwise direction (arrow F).

The trailing ends of the shoes 116 are provided with hook-shaped spring retainers 116b for outer ends of three resilient elements here shown as helical springs 118 whose inner ends are secured to the pins 113 (i.e., to the driving member 111), whereby the springs 118 tend to maintain the brake shoes in inoperative positions and out of frictional engagement with the internal surface 125a of the driven member 125.

The suporting plate 114 comprises three equidistant radially outwardly extending projections or prongs 114b each of which carries a spindle or stud 117 accommodated in an elongated slot 116c provided in the leading end portion of the respective shoe 116. These slots 116c permit the leading ends of the shoes to reciprocate radially inwardly and outwardly with respect to the plate 114 and to thereby move the leading ends of the linings 116a into or out of frictional engagement with the internal surface 125a. The studs 117 are preferably press-fitted into the plate 114.

In accordance with a further feature of my invention, the leading end of each shoe 116 comprises a cam lobe 116d which engages a cooperating cam lobe 116e at the trailing end of the adjacent shoe so that when the lobes 116d move radially outwardly under the action of centrifugal force, they entrain the cooperating lobes 116e in the same direction and compel the trailing ends of the linings 116a to engage the driven member 125.

The clutch mechanism of FIGS. 3 and 4 operates as follows:

The driving means 110, 111 rotates the supporting plate 114 and the shoes 116 in an anticlockwise direction (arrow F), as seen in FIG. 3. As soon as the rotational speed of the shoes 116 reaches a given magnitude, centrifugal force acting upon the shoes and against the bias of the springs 118 causes the trailing ends of the linings 116a to move radially outwardly and into frictional engagement with the internal surface 125a of the driven member 125. Friction between the linings 116a and the surface 125a increases gradually so that the linings first slide along and gradually entrain the driven member whereby the latter begins to rotate in a direction as indicated by the arrow F.

If the rotational speed of the driving means 110, 111 continues to increase, centrifugal force acting upon the shoes 116 also increases with resultant increase in friction between the linings 116a and the surface 125a to a point whereby the load to be driven by the shoes overcomes the bias of the springs 120 and the supporting plate 114 is angularly displaced with respect to the driving member 111 in a clockwise direction (arrow G), as viewed in FIG. 3. The angular displacement (corresponding to the angle between the radial lines H, K in FIG. 3) is determined by the length of the guide slots 114a. Of course, the plate 114 entrains the shoes 116 in the same direction so that the shoes are displaced angularly with respect to the driving member 111 in a sense to permit contraction of springs 118 whereby these springs offer less resistance to centrifugal force which tends to maintain the trailing ends of the linings 116a in frictional engagement with the surface 125a. Consequently, the shoes 116 now transmit higher torque without slip so that the driven member 125 rotates at the speed of the driving means 110, 111 and will begin to slip with respect to the linings 116a only in response to accidental jamming of the driven structure such as could cause damage to the machine in which the clutch mechanism of my invention is put to use. The angle between the radial lines H, K may be about 20°.

If the rotational speed of the driving member 111 decreases, centrifugal force acting upon the shoes 116 also decreases and the springs 120 return the supporting plate 114 to its original position, i.e., the plate 114 rotates with respect to the driving member 111 in a direction counter to that indicated by the arrow G and back to the position of FIG. 3. Such angular displacement of the plate 114 expands the springs 118 which exert a greater force against the trailing ends of the respective shoes and counteract the centrifugal force which tends to maintain the linings in frictional engagement with the driven member 125. When the rotational speed of the driving member 111 decreases still further, the springs 118 withdraw the shoes 116 into retracted or inoperative positions, thus disconnecting the driven member 125 from the driving means 110, 111. The lobes 116e then entrain the cooperating lobes 116d so that the springs 118 automatically retract the leading and the trailing ends of the linings 116a.

The clutch mechanism of FIGS. 3 and 4 is especially suited for use in automotive vehicles, such as motorcycles, aircraft, watercraft and others, as well as in many other types of machines wherein rotary motion must be transmitted at a controlled rate and wherein controlled slippage should occur at certain rotational speeds or in response to undesirably high loads.

The springs 120 control the rate of slip through a given range of rotational speed such as is necessary to insure that the engagement between the driven member 125 and the linings 116a is smooth. I prefer to provide means for adjusting the bias upon the supporting plate 114 and/ or upon the shoes 116. This can be achieved by furnishing the clutch mechanism with two or more sets of springs 118 and/or 120, each set being capable of subjecting the respective parts to a different bias. Alternately, and as shown in FIG. 3, I form the driven member 111 with one or more sets of tapped bores 111a which may receive the studs 121 so as to change the bias of the springs 120. Similar tapped bores may be provided in the supporting plate 114 for the studs 122, if desired. The bias of springs 118 may be changed by connecting the outer ends of these springs to auxiliary retainers 116b on the shoes 116.

FIGS. 5 and 6 illustrate a further clutch mechanism which constitutes a modification of the mechanism shown in FIGS. 3 and 4. This clutch mechanism comprises a driving means including a hollow driving shaft 210 and a driving member or flywheel 211 which is rigidly secured to the shaft 210. The driven member assumes the form of a drub 225 having a hub 225b which rotates about a sleeve bearing 223 surrounding the shaft 210. The hub 225b is provided with a sprocket 225c which may drive a chain, such as the chain a motorcycle or another automotive vehicle.

The clutch mechanism of FIGS. 5 and 6 is designed with a view to constitute a very small, compact unit and, therefore, it comprises only two brake shoes 216 each having its trailing end pivotally mounted on a spindle or stud 217 secured to a single supporting plate 214 which is adjacent to the right-hand side of the driving member 211, as viewed in FIG. 6. The studs 217 are located at diametrically opposite sides of the shaft 210 and are secured to radially outwardly projecting prongs 214b of the supporting plate 214. The shoes 216 are biased to their inoperative positions by resilient means here shown as helical springs 218 which operate between spring retainers 216b and studs 219, the latter fixed to the driving member 211. It will be noted that the retainers 216b are provided at the trailing ends of the respective shoes 216.

The springs 220 which bias the supporting plate 214 are located at the opposite side of the driving member 211 (see FIG. 6). The driving member 211 is formed with a pair of concentric arcuate guide slots 211b for pins 213 which are secured to the supporting plate 214 and which are connected to inner ends of springs 220. The outer ends of these springs are secured to an annular flange 211C of the driving member 211. The springs 220 tend to rotate the supporting plate 214 with respect to the driving member 211 in a clockwise direction (arrow L), as viewed in FIG. 5.

The operation of the clutch mechanism shown in FIGS. 5 and 6 is as follows:

When the driving means 210, 211 rotates in a clockwise direction (arrow L), the trailing ends of the brake linings 216a begin to rub against the internal cylindrical surface 225a of the driven member 225 as soon as the driving means attains a predetermined rotational speed, i.e., as soon as centrifugal force acting upon the shoes 216 is strong enough to overcome the bias of the springs 218. During the first stage of their engagement with the driven member 225, the linings 216a slide along the internal surface 225a, whereupon the slippage is reduced gradually and the driven member begins to rotate in the direction of arrow L and drives the sprocket 225c in the same direction.

If the rotational speed of the driving means 210, 211 increases, friction between the linings 216a and the surface 225a causes the supporting plate 214 to rotate with respect to the driving member 211 and against the bias of the springs 220 (that is, in an anticlockwise direction indicated in FIG. 5 by an arrow M), so that the studs 213 enter the trailing ends of the slots 211b. Consequently, the springs 218 are permitted to contract and offer less resistance to centrifugal force acting upon the shoes 216 so that the linings 216a are pressed against the surface 225a and establish a slip-free driving connection between the members 211, 225.

As soon as the rotational speed of the driving means 210, 211 decreases sufficiently to permit the springs 220 to retract the supporting plate 214 to the position of FIG. 5, the supporting plate tensions the springs 218 which now offer greater resistance to centrifugal force and reduce the pressure between the linings 216a and the surface 225a. At a predetermined rotational speed of the driving means 210, 211, the springs 218 retract the shoes 216 into their idle positions and the driven member 225 is then detached from the driving member 211. The angle alpha between the radial lines N, P in FIG. 5 indicates the extent of angular displacement of the supporting plate 214 counter to or under the bias of the springs 220. This angle may be about 20°. The diameter of the clutch mechanism of FIGS. 5 and 6 may be about 3", and such mechanism is capable of transmitting up to 3 H.P. at 2,000 r.p.m.

An important advantage common to the mechanisms shown in FIGS. 3, 4 and 5, 6 is that the area of frictional engagement between the brake linings and the internal surface of the driven member is greater than in the mechanism of FIGS. 1 and 2. Thus, the linings 116a or 216a may form a nearly complete annulus about the axis of the respective driving means so that the brake shoes may provide a slip-free connection between the driving and driven members when the rotational speed of the driving means reaches a predetermined magnitude at which the driven member should rotate at the speed of the driving member excepting, of course, if the driven member resists such rotation with a force which could cause damage to or destruction of the clutch mechanism.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A centrifugal clutch mechanism, comprising a driving member adapted to rotate in a predetermined direction; means for driving said member at different rotational speeds; a driven member coaxial with said driving member; supporting means mounted on and rotatable with respect to said driving member between a first and an angularly spaced second position, said supporting means rotating counter to the direction of rotation of said driving member when moving from said first to said second position thereof; a plurality of equally spaced clutch shoes articulately connected to said supporting means and movable by centrifugal force into frictional engagement with said driven member to at least contribute to movement of said supporting means from said first to said second position whereby said shoe is angularly displaced in a circumferential direction with reference to said driving member when said driving member rotates; first resilient means for biasing said shoes out of engagement with said driven member; means connecting said first resilient means to each of said shoes and to said driving member, said angular displacement of said shoes being in a direction to decrease the bias of said first resilient means thereon when said supporting means rotates from said first to said second angular position and second resilient means operatively connected to said supporting means and to said driving member for biasing said supporting means to said first angular position.

2. A clutch mechanism as set forth in claim 1, wherein each of said shoes comprises a trailing end and a leading end and wherein said shoes are arranged in such a way that the leading end of each shoe abuts against the trailing end of an adjacent shoe to move the respective trailing end into engagement with said driven member when said driving member rotates.

3. A clutch mechanism as set forth in claim 2, wherein said first resilient means comprises a plurality of helical springs, one for each of said shoes and each of said springs connected to the trailing end of the respective shoe.

4. A clutch mechanism as set forth in claim 2, wherein said leading ends have limited freedom of movement with respect to said supporting means in the radial direction of said driving member.

5. A clutch mechanism including a centrifugal clutch comprising a rotary driving member, a rotary driven member coaxial with said driving member, a plurality of support means pivotally mounted on the driving member and turnable about axes offset from the rotational axis of the driving member, a plurality of shoes each having a leading and a trailing end and each being pivotally mounted at its leading end on the respective support means and movable by centrifugal force together with said support means between a forward position relative to the normal direction of rotation of the driving member and a rear position in which said shoes are in frictional engagement with said driven member said support means being arranged to wedge the respective shoes against the driven member in such rear position, support spring means for urging said support means and the respective shoes toward their forward positions the frictional force exerted on the shoes by the driven member contributing to movement of said shoes and the respective support means toward their rear positions whereby said shoes are angularly displaced with reference to said driving member, return spring means for urging the shoes out of engagement with said driven member against the action of the centrifugal force acting on the shoes upon rotation of the driving member and means connecting said return spring means to said shoes and to said driving member, said angular displacement of said shoes being in a direction to decrease the bias of said return spring means upon said shoes when said support means moves from said forward to said rear position.

6. Clutch mechanism as claimed in claim 5, wherein the return spring means comprises a plurality of return springs, one for each shoe and each connected to the trailing end of the respective shoe and to the driving member rearwardly of the respective trailing end, whereby movement of each shoe towards its rear setting reduces the tension of the respective return spring.

7. Clutch mechanism as claimed in claim 5, further comprising a uni-directional clutch comprising annularly arranged rotary clutch elements eccentrically pivotally mounted on one of said members, the other of said members having a cylindrical surface and each clutch element having a convex surface and being eccentrically pivotable with respect to said cylindrical surface and arranged to engage in at least one pivotal position thereof said cylindrical surface, and clutch spring means for urging the clutch elements into said one pivotal position in contact with the cylindrical surface, the eccentric arrangement of the convex surface of each clutch element relative to the axes of rotation of said elements being such that the clutch elements permit angular movement of the driving member relative to the driven member in one direction of rotation and prevent relative angular movement in the opposite direction, said clutch elements being wedged against the cylindrical surface in response to relative rotation in such opposite direction.

8. Clutch mechanism as claimed in claim 5, further comprising a secondary clutch operatively connected to and rotatable by said driven member.

9. Clutch mechanism as claimed in claim 7, wherein the support means for each shoe comprises two spaced plates and a pivot pin mounting the plates on the driving member, and the clutch elements comprise rollers eccentrically mounted on said pivot pins and disposed between the plates of the respective support means.

References Cited by the Examiner

UNITED STATES PATENTS

| | | |
|---|---|---|
| 1,853,908 | 4/32 | Lake. |
| 1,917,501 | 7/33 | Cotterman. |
| 2,762,483 | 9/56 | Clark. |
| 2,970,680 | 2/61 | Cain. |

FOREIGN PATENTS

| | | |
|---|---|---|
| 1,109,553 | 9/55 | France. |
| 100,265 | 2/16 | Great Britain. |

DAVID J. WILLIAMOWSKY, *Primary Examiner.*